United States Patent [19]
Tubbs

[11] Patent Number: 5,941,687
[45] Date of Patent: Aug. 24, 1999

[54] GAS TURBINE ENGINE TURBINE SYSTEM

[75] Inventor: Henry Tubbs, Tetbury, United Kingdom

[73] Assignee: Rolls-Royce plc, London, United Kingdom

[21] Appl. No.: 08/951,302

[22] Filed: Oct. 16, 1997

[30] Foreign Application Priority Data

Nov. 12, 1996 [GB] United Kingdom .................... 9623482

[51] Int. Cl.⁶ ..................................................... F01D 5/18
[52] U.S. Cl. ....................................... 416/97 R; 416/96 R
[58] Field of Search .............................. 415/115; 416/95, 416/96 R, 96 A, 97 R, 220 R

[56] References Cited

U.S. PATENT DOCUMENTS

| | | | |
|---|---|---|---|
| 2,920,865 | 1/1960 | Lombard | 416/97 R |
| 3,712,756 | 1/1973 | Kalikow et al. | 416/97 R |
| 4,447,190 | 5/1984 | Campbell | 415/115 |
| 4,818,178 | 4/1989 | Sibbertsen | 416/97 R |

FOREIGN PATENT DOCUMENTS

| | | |
|---|---|---|
| 0232782 | 8/1987 | European Pat. Off. . |
| 1526683 | 5/1968 | France ................................ 416/220 R |
| 53-1711 | 1/1978 | Japan .................................... 416/97 R |
| 0742477 | 12/1955 | United Kingdom . |
| 904546 | 8/1962 | United Kingdom ................. 416/96 R |
| 988541 | 4/1965 | United Kingdom .............. 416/220 R |
| 1467801 | 3/1977 | United Kingdom . |
| 1561229 | 2/1980 | United Kingdom . |
| 2057573 | 4/1981 | United Kingdom . |
| 2095765 | 10/1982 | United Kingdom . |
| 2189845 | 11/1987 | United Kingdom . |
| 2236145 | 3/1991 | United Kingdom ................. 416/97 R |
| 2270126 | 3/1994 | United Kingdom . |

*Primary Examiner*—Christopher Verdier
*Attorney, Agent, or Firm*—W. Warren Taltavull; Farkas & Manelli PLLC

[57] ABSTRACT

When cooling air from a gas turbine engine compressor is supplied in greater quantities than is needed, the flow thereof is reduced firstly and mainly by ensuring that the air leaves a blade stage cooling thereby at a radius less than that of its entry. A pressure head results which slows the cooling air flow rate prior to its entering a plenum chamber defined by the disc of the stage and fixed structure. There is a reduced tendency of the air to enter the gas stream.

3 Claims, 2 Drawing Sheets

GAS TURBINE ENGINE TURBINE SYSTEM

THE FIELD OF THE INVENTION

The present invention relates to a gas turbine engine turbine system the primary use of which is the provision of power for driving a fan or compressor during the propulsion of an aircraft.

BACKGROUND OF THE INVENTION

More particularly the invention relates to the inclusion in a turbine system of the kind described hereinbefore, of means whereby during operation of a said system, hot gas flow through the system and a cooling airflow within the system is such as to provide substantial equalising of the static pressures of the respective flows, in areas where they may mix in an undesirable manner.

Prior art turbine systems are known to provide a cooling airflow to turbine blades in a turbine, so that on take-off of an associated aircraft when maximum temperatures are generated for a short period, the blade mechanical integrity is not affected by the heat.

Take-off normally occupies only a very small proportion of the total flight time of an aircraft. For the majority of its flying time, the aircraft is under cruise conditions in which its associated engines operate at reduced throttle settings. Under these conditions, the gas temperatures within the engines reduce as do the stresses imposed upon the components of the engines as engine rotational speed reduces. Consequently, under these cruise conditions, the cooling airflow to the engine's turbine blades is usually in excess to that which is actually required. The excess cooling air leaves the blades and enters the gas flow where it mixes and reduces the gas temperature and pressure. The thermal efficiency of the system, and therefore the specific fuel consumption of the engine, are thereby degraded.

Our co-pending Patent Application U.S. application Ser. No. 08/953,006 entitled 'Method and Apparatus for Controlling Cooling Air in a Gas Turbine Engine' filed at the same time as the application accompanying this specification provides an improved manner and apparatus for reducing the cooling airflow over and above the reduction thereof achieved by reduced compressor output by providing valve means in the airflow path adjacent its entry into the turbine system. The valve means is operable to enable full compressor cooling air output to be varied, to the point of all but completely stopping the flow from entering the turbine system.

SUMMARY OF THE INVENTION

The present invention seeks to provide a further improvement in the control of cooling airflow to a turbine system of a gas turbine engine.

According to the present invention a turbine system in a gas turbine engine includes a stage of rotor blades operationally in a gas stream each rotor blade having an internal cooling airflow passage, a cooling air inlet to said passage positioned in the upstream region of said rotor blade stage and at the radially inner end portion of said rotor blade relative to the axis of rotation of said stage and a cooling air outlet from said passage in the downstream region of said rotor blade stage and positioned radially inwardly of said inlet whereby to provide during operation a pressure head, the effect of which is to counter balance the pressure drop in the gas stream between the upstream and downstream regions of said rotor blade stage.

BRIEF DESCRIPTION OF THE DRAWINGS

The invention will now be described by way of example and with reference to the accompanying drawings in which.

DETAILED DESCRIPTION OF THE INVENTION

Figure 1:
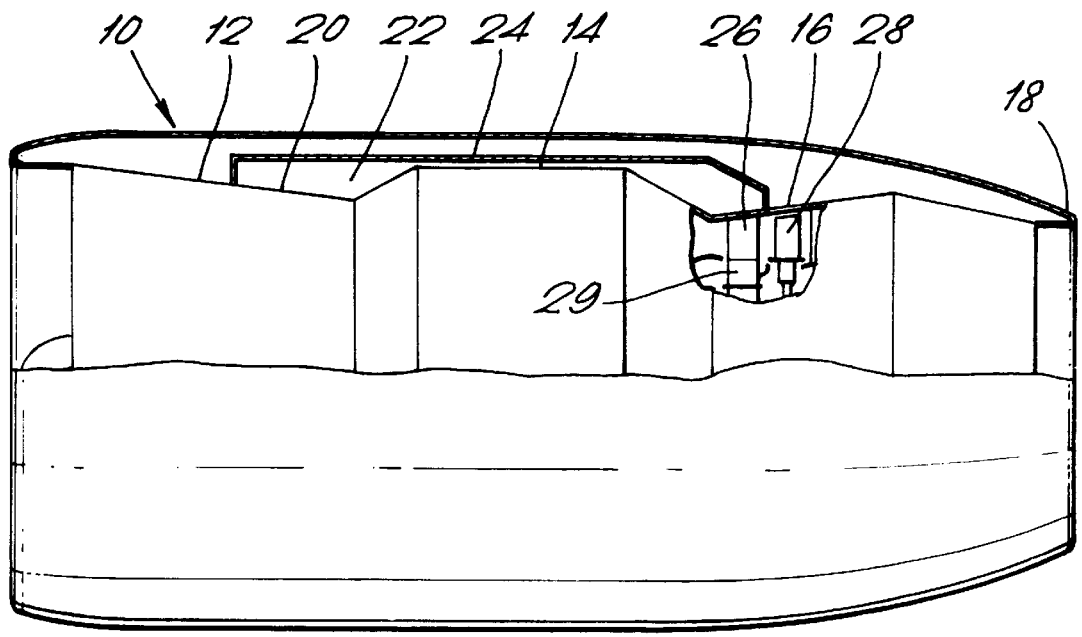
FIG. 1 is a diagrammatic, part cross-sectional view of a gas turbine engine incorporating an example of the present invention.

Referring to FIG. 1, a gas turbine engine 10 comprises a compressor 12, combustion equipment 14, a turbine system 16 and an exhaust nozzle 18, all arranged in flow series in generally known manner.

An airflow take-off point 20 from the compressor 12 is connected to a space 22 defined by the combustion equipment 14 and an outer casing 24. The space 22 should be insulated from the heat emanating from the combustion equipment by any suitable shielding.

In operation of the engine 10, air taken from the compressor 12 passes via the space 22 and thence to inlet guide vanes 26 between the combustion equipment 14 and a stage of rotor blades 28 comprising part of the turbine system 16.

The airflow is used for the purpose of cooling the inlet guide vanes 26 and achieves this by passing through the interior of each vane 26 to be ejected therefrom in part via the holes (not shown in FIG. 1) in the walls of the vanes 26 and in part via holes (not shown) in the radially inner ends of the guide vanes 26. These features are known per se.

Air ejecting from the holes (not shown) in the walls of the vanes 26 directly enter the gas stream. Air ejecting from the underside of the vanes 26 enters a plenum chamber 29.

Figure 3:
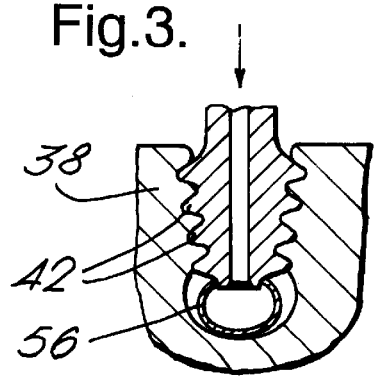
FIG. 3 is a view on line 3—3 of FIG. 2.
Figure 2:
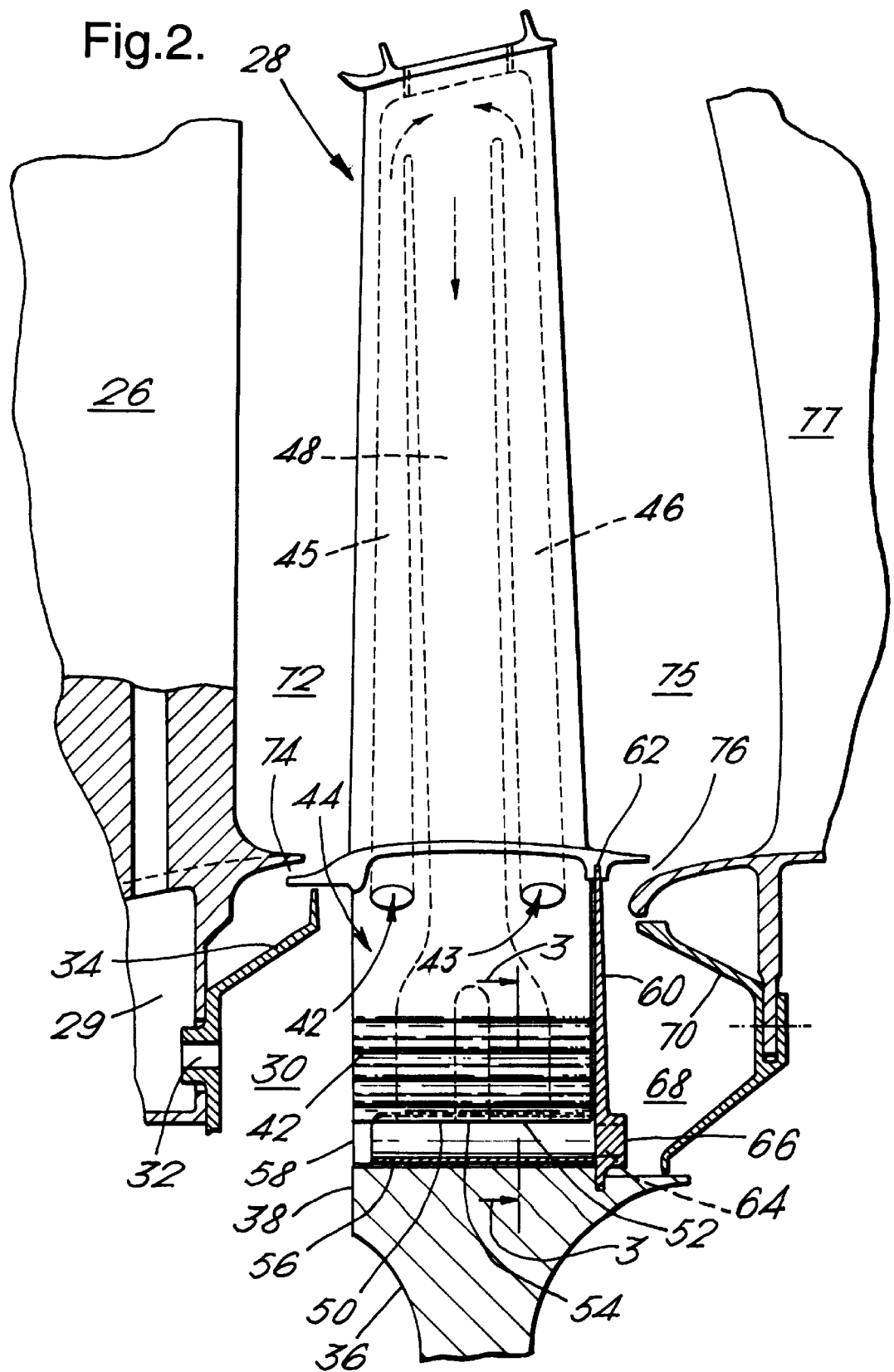
FIG. 2 is an enlarged, part cross-sectional view of a portion of the turbine system of the gas turbine engine of FIG. 1.

Referring now to FIG. 2, the plenum chamber 29 is in flow connection with a further, annular chamber 30 via nozzles 32. The chamber 30 is defined by an annular metal sheet member 34 and the upstream face of a turbine disc 38, in which the stage of turbine blades 28 of the turbine system 16 are located via known fir tree roots 42 (more clearly appreciated in FIG. 3).

The nozzles 32 are angled such that the air is ejected therefrom in a direction having a large component in the direction of rotation of the disc 38. This ensures that the airflow may enter inlet holes 42,43 in the neck 44 of each blade 28 without pressure losses due to incidence.

The air then flows radially outwardly of the axis of rotation of each blade 28 along respective leading and trailing edge passages 45,46 to meet at the radially outer ends thereof and return via a central passage 48 which divides prior to terminating at exit holes 50,52 in the under surface 54 in each blade 28.

The air, on passage through the blades 28 extracts a considerable amount of heat from the blade walls by simple conduction. The rim portion of the turbine disc, already under great mechanical stress, must be shielded from the hot air as it is ejected and this is achieved by the provision of an open sided metal tube 56, which is loaded by centrifugal force on to the inner extremity of each blade root 42, thus forming a passage which is blocked at its upstream end by a tang 58 formed on the blade root 42. By upstream is meant with respect to the direction of flow of gases through the engine 10.

Arcuate locking plates 60, known per se, locate in grooves 62,64 on the disc 38 and platforms of the blades 28. The known plates 60 however, are adapted for the purpose of operation of the present invention by the provision of nozzles 66, each of which is aligned with a respective tube 56 so as to enable the passage of air therefrom into a plenum chamber 68 defined by the lockplates 60, and fixed structure 70. The nozzles 66 are angled such that the air is ejected therefrom in a direction having a large component opposite to the direction of rotation of the disc 38.

The plenum chambers 30 and 68 are in undesirable flow communication with the gas annulus 72 and 75 via clearance gaps 74 and 76 between the rotating turbine stage 28 and a fixed guide vane stages 26 and 77. The gaps 74 and 76 are a common, unavoidable feature of all turbine systems and in prior art turbine systems, suffer excessive leakage of cooling air therethrough during certain operating regimes of an associated engine. The effect is to degrade the thermal efficiency and consequently the specific fuel consumption of the engine. Under other operating conditions, hot gas leaks into the plenum chambers 30 and 68 and has been known to destroy the mechanical integrity of the rotating structure. However, the positioning of the blade cooling air outlet holes 50,52 radially inwardly of their inlet holes 42,43 ensures that a head of pressure is generated by the cooling airflow, at least during cruise flight of an associated aircraft, when its associated engine is throttled back. A reduction in cooling air flow rate during cruise is permissible without the possibility of hot gas entering at 74. It follows that the cooling air then enters nozzles 66 at a reduced rate.

The nozzles 66 are, as stated earlier, angled so as to eject the cooling air into the plenum chamber 68 in a direction substantially opposite to the direction of rotation of the turbine disc 38, which reduces the rotational speed of airflow to virtually zero, relative to the fixed structure 70.

On reading this specification the man skilled in the particular art will realise, that by utilising the present invention, cooling airflow may be more widely controlled than has been possible hitherto, as it provides means, to reduce cooling airflow whilst avoiding hot gas injection.

In those engines, if any, where the extra cooling flow reduction achieved as described hereinbefore, is still insufficient, then a further example of the present invention may be incorporated therewith, that further example being described in our co-pending application U.S. application Ser. No. 08/953,006 filed simultaneously herewith. Thus the valve described and illustrated therein in the context of the present invention should be regarding as fully incorporated in this specification.

I claim:

1. A turbine system for a gas turbine engine including a disc and a stage of rotor blades supported by that disc and including an upstream and a downstream region of said stage, said stage of rotor blades having an axis of rotation and being located operationally in a gas stream with the stream passing through said stage with a pressure drop occurring between the upstream and downstream regions of said rotor blade stage, each rotor blade having an internal cooling air passage, a cooling airflow inlet to said passage positioned in the upstream region of said rotor blade stage and at the radially inner end portion of said blade relative to said axis of rotation of said stage and a cooling air outlet from said passage in the downstream region of said rotor blade stage and positioned radially inwardly of said inlet a distance sufficient to provide during operation, a pressure head sufficient to counterbalance the pressure drop in the gas stream between the upstream and downstream regions of said rotor blade stage.

2. A turbine system as claimed in claim 1 wherein the outlet is positioned in the radially inner end surface of the blade.

3. A turbine system as claimed in claim 1 including a plenum chamber in fluid flow communication with said outlets via nozzle means provided in a wall of said plenum chamber, thru which nozzle means a flow of cooling air passes at an angle having a component of direction opposite to the direction of rotation of said disc.

* * * * *